United States Patent [19]
Jenkins

[11] 4,004,762
[45] Jan. 25, 1977

[54] AIRCRAFT UNDERCARRIAGE WITH RIDE CONTROL MEANS

[75] Inventor: Stanley Frederick Noel Jenkins, Leamington Spa, England

[73] Assignee: Automotive Products Company Limited, Leamington Spa, England

[22] Filed: June 3, 1975

[21] Appl. No.: 583,424

[30] Foreign Application Priority Data

June 6, 1974 United Kingdom ............ 25248/74
Sept. 9, 1974 United Kingdom ............ 39322/74

[52] U.S. Cl. ..................... 244/104 FP; 267/64 R; 267/DIG. 1
[51] Int. Cl.² ........................................ B64C 25/60
[58] Field of Search ................. 244/104 FP, 104 R; 267/64 R, DIG. 1, DIG. 2

[56] References Cited
UNITED STATES PATENTS 2,698,751  1/1955  Nye et al. ............... 244/104 FP X
2,814,482  11/1957  Anderson et al. ....... 244/104 FP X

*Primary Examiner*—Trygve M. Blix
*Assistant Examiner*—Barry L. Kelmachter
*Attorney, Agent, or Firm*—Lawrence J. Winter

[57] ABSTRACT

An aircraft undercarriage includes a liquid filled telescopic suspension strut and a compressed gas chamber separated from the liquid in the strut by a floating piston. Liquid is added to or taken away from the strut by a ride control valve operated by a ride control mechanism sensitive to relative displacement of the airframe and undercarriage wheel so that the aircraft is maintained at a constant height during taxiing. Shut-off valves isolate the strut from the hydraulic system of the aircraft during flight and landing touchdown.

14 Claims, 6 Drawing Figures

AIRCRAFT UNDERCARRIAGE WITH RIDE CONTROL MEANS

This invention relates to aircraft undercarriages incorporating shock-absorbing struts in which resilient means, usually an enclosed quantity of gas, are loaded to absorb landing shocks by the action of liquid on a movable wall, the displacement of which varies the loading of the resilient means.

In suspensions for land vehicles, using struts generally similar to those referred to above, it has been proposed to maintain a desired mean level of the vehicle above the ground surface and to control pitching or rolling of the vehicle by a ride control mechanism which feeds liquid into or withdraws liquid from the struts automatically in response to tendencies for the mean level or the attitude of the vehicle to change so as to oppose such changes.

It is an object of the invention to provide an aircraft undercarriage suspension incorporating a similar ride control mechanism.

The invention provides an aircraft undercarriage including one or more suspension struts which support at least part of the weight of the aircraft by a ground-contacting element, the or each strut including resilient means which absorb landing shocks by the action of liquid on a movable wall, the displacement of which varies the loading of the resilient means, and ride control valve means, actuated by a ride control mechanism sensitive to displacement of the aircraft relative to the ground to connect the suspension strut or struts selectively to a source of liquid pressure or a drain, wherein further valve means inhibit connection of the strut or struts to the liquid pressure source and drain except when the aircraft is supported on the ground by the undercarriage.

Figure 1:
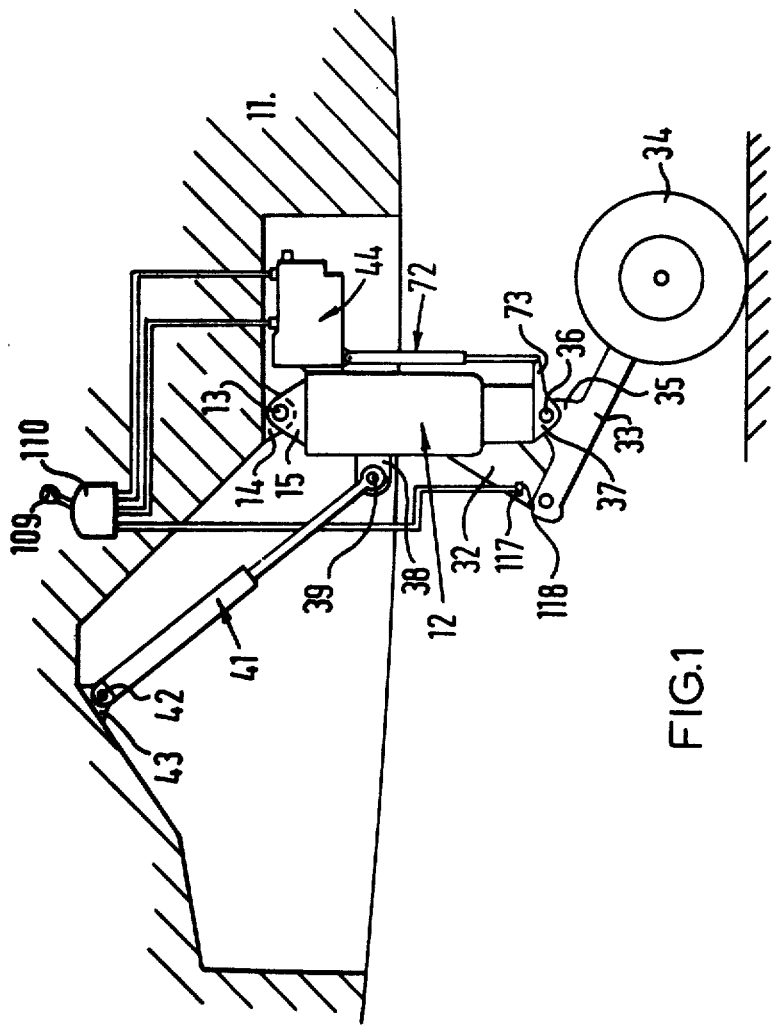
FIG. 1 is an elevation of one example of an aircraft undercarriage according to the invention, incorporating one form of ride control mechanism.
Figure 2:
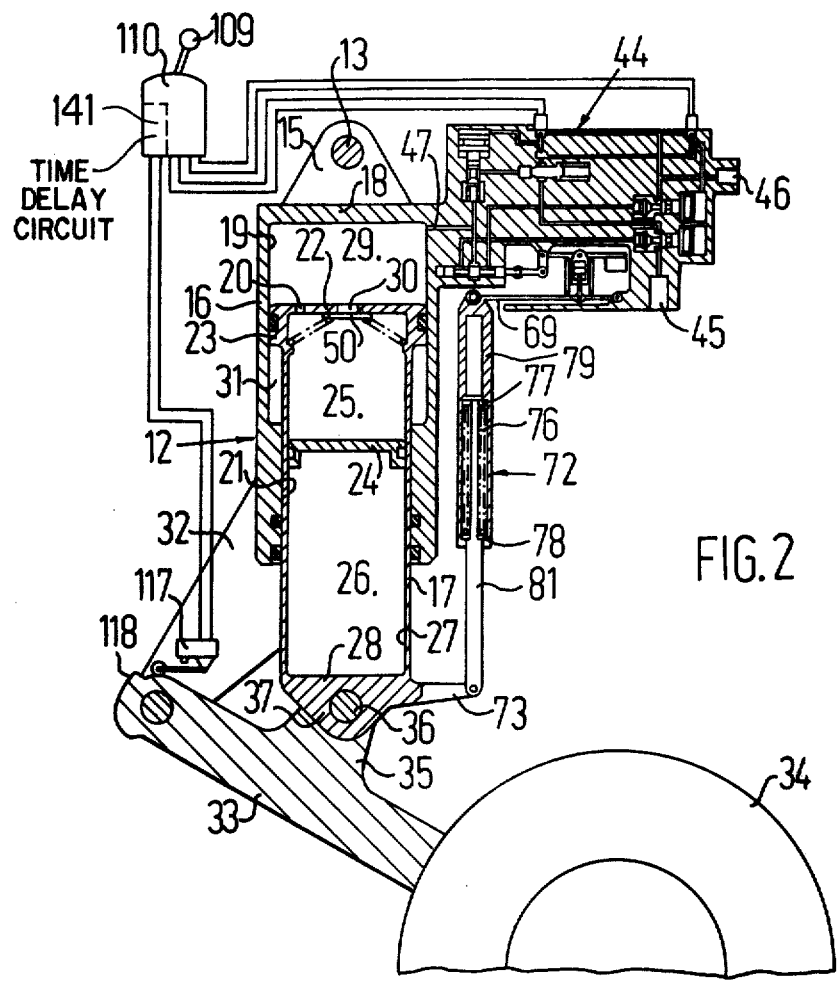
FIG. 2 is a cross-section of a suspension strut and control valve block shown in FIG. 1, drawn to a larger scale.
Figure 3:
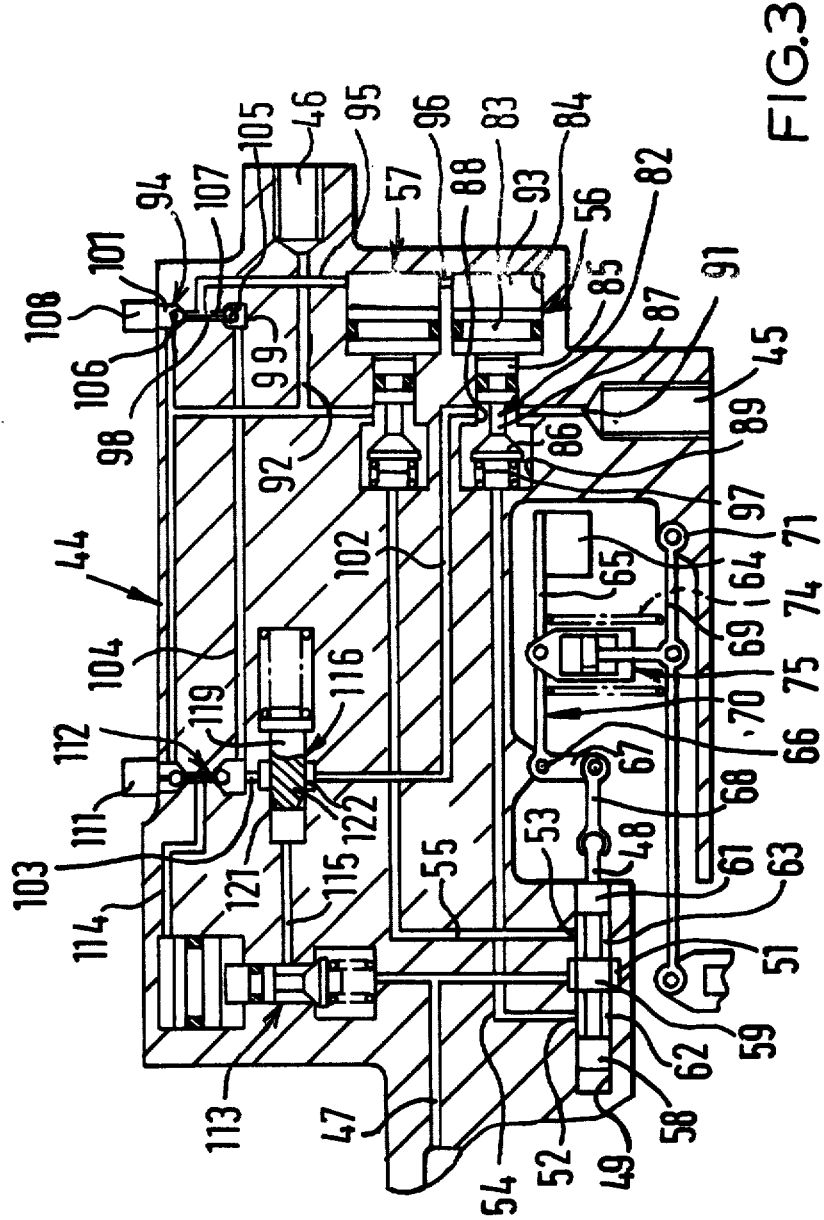
FIG. 3 is an enlarged cross-section of the control valve block shown in FIG. 2.

Referring to FIG. 1, FIG. 2 and FIG. 3, an aircraft 11 incorporates a retractable undercarriage comprising a telescopic suspension strut 12 pivotably attached to the aircraft structure by a pivot pin 13 which extends through a bracket 14 on the airframe and a lug 15 on one end of the strut. The strut 12 comprises two concentric hollow cylinders 16, 17. The outer cylinder 16 incorporates a stepped bore comprising a large bore 19 and a small bore 21. An end wall 18 at the end of large bore 19 further from the small bore 21 incorporates the lug 15.

The inner cylinder 17 is slidable in the small bore 21. One end of the inner cylinder nearer the end wall 18 incorporates an end wall 22 and an annular flange 23, the outer peripheral surface of which is slidable in the bore 19. A floating piston 24 divides the space inside the inner cylinder 17 into an upper chamber 25, defined by a bore 27 in which the piston 24 slides and the end wall 22, and a lower chamber 26, defined by the bore 27 and another end wall 28 at the opposite end of cylinder 17 to end wall 22.

The cylinder 17, with the flange 23, divides the space encircled by bore 19 of the outer cylinder 16 into a chamber 29 and an annular chamber 31. The end wall 22 which separates chamber 29 from chamber 25 incorporates a small orifice 20 providing communication between chambers 29 and 25 for flow in either direction and a large orifice 30 closed by a plate 50 urged against the end wall 22 by a spring 60. The plate 50 and spring 60 act as a check valve which allows fluid flow through orifice 30 from chamber 29 to chamber 25 but not in the opposite direction from chamber 25 to chamber 29.

The outer cylinder incorporates a bracket 32 which pivotably supports one end of a swinging arm 33. The other end of the swinging arm 33 carries a wheel 34. Between the two ends of the swinging arm 33 there is incorporated a lug 35 which is pivotably connected to a lug 37 on the end wall 28 of the inner cylinder 17 through a pin 36. The connection formed by lugs 35 and 37 and pin 36 allows a degree of relative movement in the direction parallel to the direction of travel of wheel 34.

A lug 38 on the outer cylinder 16 provides, with pin 39, a pivotable connection with one end of an actuator strut 41, the other end of which is connected to the airframe through a pin 42 and bracket 43.

At the upper end of the outer cylinder 16 there is a valve block 44 having a port 45 for connection to the main hydraulic pressure supply of the aircraft and a drain port 46 for connection to the main unpressurised hydraulic return line. A passage 47 connects the valve block 44 with the chamber 29.

The chamber 29 is connectable to port 45 or port 46 through ride control valve means comprising a valve spool 48 slidable in a bore 49 in the valve block 44. An annular groove 51 connects to passage 47 and is situated in the bore between a port 52 and a port 53. The ports 52 and 53 are respectively connected to the pressure port 45 and the return port 46 through passages 54 and 55 and further valve means comprising shut-off valves 56 and 57. The spool 48 comprises three lands 58, 59 and 61 interposed by two annular grooves 62 and 63. In the central position of the spool 48 as shown in FIG. 3 the groove 51 is blocked by the central land 59. If spool 48 is moved to the left, passage 47 is connected to passage 55 through grooves 51 and 63 and port 53. If spool 48 is moved to the right, passage 47 is connected to passage 54 through grooves 51 and 62 and port 52.

The valve spool 48 is actuated by a ride control mechanism comprising a mass 64 on the end of one horizontal arm 65 of a bell crank 70 which pivots on the valve block 44 by a pin 66 and has the end of its other, vertical, arm 67 connected to the valve spool by a pivotable link 68. A lever 69 has one end which pivots on the valve block 44 by a pin 71 and is arranged substantially parallel to the horizontal arm 65 of the bell crank. The other end of the lever 69 is connected to one end of a springbox link 72 the other end of which is connected to a bracket 73 on the inner cylinder 17 of the strut 12. The bell crank horizontal arm 65 is connected to the lever 69 by a spring 74 and a damper dashpot 75.

The springbox link 72 comprises a pre-compressed coil spring 76 which urges apart two washers 77, 78 against abutments formed by steps in the bore of a cylinder 79 and steps in the outer diameter of a plunger 81. The steps which form the abutment for each washer are in the same plane so that linear movement of the plunger 81 relative to the cylinder 79 in either direction causes further compression of spring 76.

The annular space 31 in the strut 12 is vented to atmosphere and space 26 is charged with nitrogen gas under pressure. Hydraulic pressure in passage 47 is transmitted to chamber 29 and to chamber 25 through the orifices 20 and 30 and acts on the floating piston 24 which thus forms a movable wall which loads the resilient means formed by the nitrogen gas in chamber 26. When the aircraft is stationary on the ground and there is no relative movement between the outer strut cylinder 16 and the inner strut cylinder 17, the pressures in chambers 25, 26 and 29 are the same and the ground reaction on wheel 34 due to the weight of the aircraft is taken by the swinging arm 33 and the strut 12. The relative positions of the inner strut cylinder 17 and the outer strut cylinder 18 are governed by the valve spool 48. The bracket 73, springbox link 72, lever 69, spring 74, bell crank 70 and link 68 together control the position of spool 48 such that when the strut 12 is in its mid-stroke position as shown in FIG. 1 valve spool 48 is in the central or lap position as shown in FIG. 2. An increase in the static ground reaction force on wheel 34 compresses the strut 12 so that lever 69 is moved clockwise by the springbox link 72 which in turn moves the bell crank 70 anti-clockwise and moves the link 68 and spool 48 to the right. This allows hydraulic oil under pressure from port 45 to enter chamber 29 through passage 47 to extend the strut 12. Extension of the strut 12 restores the valve spool 48 to the lap position, isolating the oil in chamber 29. Similarly a reduction in the static ground reaction force on wheel 34 causes the strut 12 to extend, moving the spool 48 to the left and allowing a quantity of oil from chamber 29 to drain out through port 46. The strut 12 is thus compressed and the spool 48 is restored to the lap position.

Lever 69 is allowed only a small movement in relation to the stroke of the strut 12. This movement is sufficient to move spool 48 over it full operational travel range and during such movement the springbox link 72 acts as a rigid link, the spring 76 remaining at its pre-stressed length as shown in FIG. 1. Travel of the strut 12 in either direction which is greater than that which takes lever 69 to the limit of its permitted movement is absorbed by springbox link 72 which is compressed or extended to the extent of the extra travel.

The arrangement of the bell crank 70 with the mass 64, spring 74, dashpot 75 and lever 69 functions in the manner of the ride control mechanism described in U.S. Pat. No. 3,612,570. The mass 64, spring 74 and dashpot 75 are chosen so that the damped natural frequency of oscillation of the bell crank 70 about its pivot is substantially the same as the bounce frequency of the aircraft when taxiing on wheel 34. The effect is that for low frequency changes in the ground reaction force on wheel 34 such as occur during braking of the aircraft, the spool 48 is moved and accordingly adds more oil to strut 12 or allows a quantity to drain away. For high frequency changes in the ground reaction force on wheel 34, such as occur during taxiing at speed, the mass 64 remains stationary relative to the airframe, so that the spool 48 remains stationary and no oil is added to or allowed to drain from the strut 12.

When the strut 12 moves under taxiing conditions as described above and no oil enters or leaves through passage 47, the strut 12 acts as a conventional oleo-pneumatic shock absorber. Compression of the strut 12 causes oil to be forced from chamber 29 through the orifice 20 into chamber 25 and the floating piston 24 is moved downwards towards the end wall 28, compressing the gas in chamber 26. Similarly, extension of the strut 12 allows oil to flow back into chamber 29 from chamber 25 under the pressure of the gas in chamber 26 acting on the floating piston 24. The small orifice 20 acts as a damper for all extension movements of the strut 12 and for low velocity compression movements such as occur during taxiing on smooth runways. For high velocity compression movements such as occur during landing or taxiing on rough airfields, the plate 50 is forced away from the large orifice 30 by the pressure difference across the wall 22 and thus the large orifice 30 takes over the damping.

Each shut-off valve 56, 57 comprises a stepped bore in the valve block 44 in which is situated a poppet 82 and a piston 83. Each piston 83 is slidable in a large diameter bore portion 84 at one end of the stepped bore and abuts a plunger portion 85 formed at one end of the associated poppet 82. The other end of the poppet 82 is formed with an inverted frusto-conical head 86. The stem 87 of the poppet 82 is of smaller diameter than the plunger portion 85. The plunger portion 85 is slidable in a small diameter bore portion 88 of the stepped bore which is between the large diameter bore portion 84 and a medium diameter bore portion 89. The largest diameter of the frusto-conical head 86 is smaller than the medium diameter bore portion 89 but larger than the small diameter bore portion 88.

The pressure port 45 connects to the small diameter bore portion 88 of shut off valve 56 by a passage 91 which opens into that bore 88 at a position between the step of that bore 88 with the medium diameter bore portion 89 and the poppet plunger portion 85. The return port 46 connects by a passage 92 to an identical position in the stepped bore of valve 57. The passage 54 connects with the chamber encircled by the medium diameter bore portion 89 of valve 56 and the passage 55 connects with the chamber encircled by the medium diameter bore porton 89 of valve 57.

A chamber 93 is defined in each valve 56 and 57 between the closed end wall of the large diameter bore portion 84 and the piston 83 and each chamber 93 connects to a solenoid valve 94 through a passage 95 and linking passage 96. When pressure is supplied to each chamber 93 the associated piston 83 and poppet 82 are held in the position shown in FIG. 2 against the bias of a spring 97 acting between the end wall of the medium diameter bore porton 89 and the frustro-conical head 86 so that passage 91 communicates with passage 54 and passage 92 communicates with passage 55 by virtue of a gap between the frusto-conical head 86 and the step between the associated medium diameter bore portion 89 and small diameter bore portion 88. Operation of the solenoid valve 94 to exhaust passages 95 and 96 allows the spring 97 of each valve 56 and 57 to move the associated poppet 82 and piston 83 to the right, causing the frusto-conical head 86 to seat on the step between the medium diameter bore portion 89 and the small diameter bore portion 88 and cutting off communication between passages 91 and 54 and passages 92 and 55 respectively.

The solenoid valve 94 comprises a bore 98 linking two chambers 99 and 101. Passage 95 opens into bore 98, chamber 99 being supplied with oil under pressure through passage 91 and further passages 102, 103 and 104. Chamber 101 is open to the return port 46 through passage 92. Valve seats are formed at each end of bore 98 to allow each end to be alternately blocked by one of two part spherical heads 105, 106 on a stem 107 which is a loose fit in the bore 98. The head 106 is connected to the armature of a solenoid 108 such that when solenoid 108 is energised the head 106 is forced onto its associated seat to block that end of bore 98 which opens into chamber 101 and the head 105 is clear of its associated seat to open bore 98 to chamber 99. In this position oil under pressure is supplied to passage 95 to open the shut off valves 56 and 57 as described.

When shut-off valves 56 and 57 are open the undercarriage is in the taxiing condition. After the aircraft has taken-off the pilot actuates a selector lever 109 on an undercarriage control system module 110 which de-energises solenoid 108 to close shut-off valves 56 and 57.

The above description is particularly related to the strut, ride control valve and mechanism and the shut-off valves for inhibiting the connection of the ride control valve to the pressure source and drain when the aircraft is airborne. The following description is particularly related to undercarriage retraction and the restoration of ride control after undercarriage lowering and aircraft landing.

Having de-energised solenoid 108 to close shut-off valves 56 and 57, the undercarriage control system module 110 subsequently energises a solenoid 111 which is part of another solenoid valve 112 identical in construction to the solenoid valve 94. This solenoid valve 112 controls a third shut-off valve 113 which is identical in construction to the two shut-off valves 56 and 57. Referring to parts of valves 112 and 113 by the same references as the identical parts of valves 94 and 56 and 57, the bore 98 of solenoid valve 112 is connected to the chamber 93 of shut-off valve 113 by a passage 114. The medium diameter bore portion 89 of shut-off valve 113 connects with the passage 47 and passage 115 connects the small diameter bore portion 88 between the step with the medium diameter bore portion 89 and the plunger portion 85 with a throttling valve 116. The throttling valve 116 comprises a spring loaded plunger 119 having slots 121 which allow a restricted flow from passage 102 to passage 115. Annular passage 122 allows unrestricted flow from passage 102 to passage 103. Solenoid valve 112 has pressure and return connections to passages 104 and 92 in a similar manner to valve 94. When solenoid 111 is de-energised the passage 114 is at return line pressure and shut-off valve 113 is closed.

Energising solenoid 111 after take-off opens the shut-off valve 113 by pressurising passage 114 and allows oil under pressure to be transmitted through passages 86 and 102, through the throttling valve 116 and passage 115 to passage 47 and the strut chambers 29 and 25, thus by-passing the ride control valve. This extends the strut 12 to its fullest extent whereupon a switch 117 attached to the bracket 32 and actuated by a cam profile 118 on the swinging arm 33 closes a circuit which causes the actuator strut 41 to be retracted, so that the whole assembly of strut 12 with valve block 44, swinging arm 33 and wheel 34, pivots about pin 13 and is drawn into a fuselage pod. The switch 117 also de-energises solenoid 111 so that shut-off valve 113 is closed to isolate the strut from the main hydraulic supply.

Prior to landing the aircraft, the pilot moves the undercarriage selector lever 109 to the "Undercarriage Down" position which extends actuator strut 41 to bring the undercarriage assembly back into the position shown in FIG. 1. On aircraft touch-down the switch 117 completes a circuit through a time delay circuit 141 incorporated in the undercarriage control module 110 which energises solenoid 108 and opens shut-off valves 56 and 57 to bring the ride control into operation.

Figure 4:
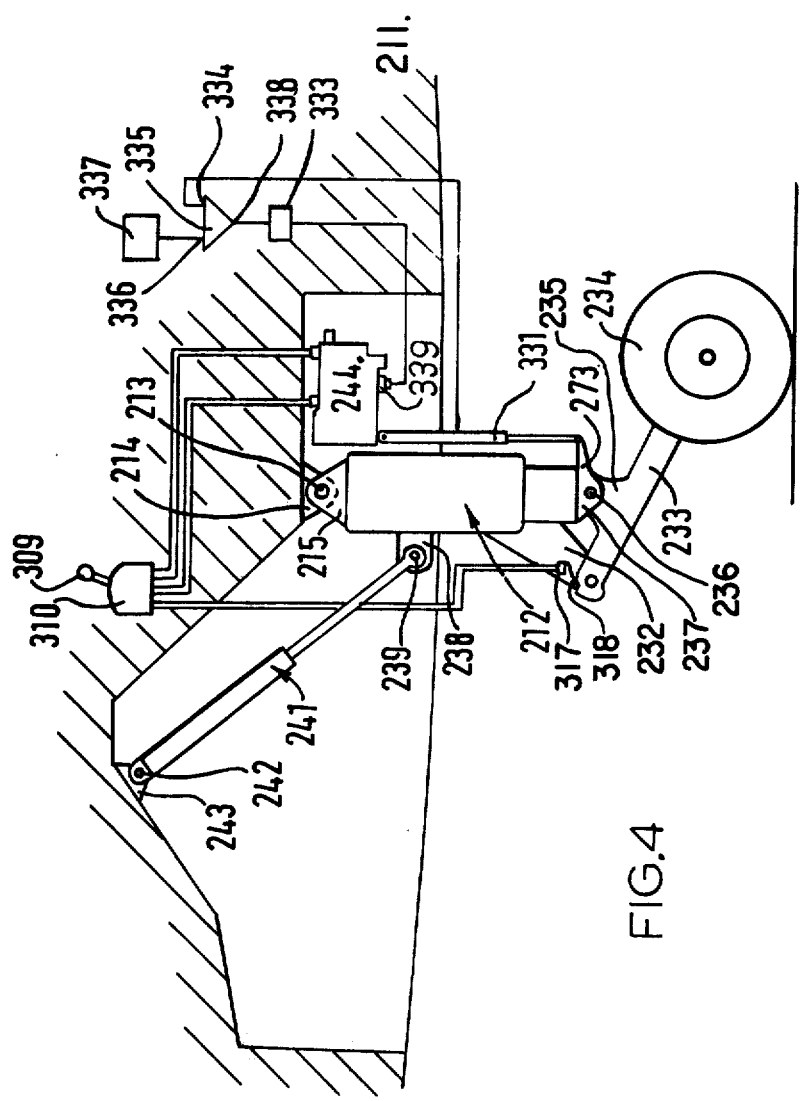
FIG. 4 is an elevation of an aircraft undercarriage which is similar to that shown in FIG. 1, but incorporating another form of ride control mechanism.
Figure 5:
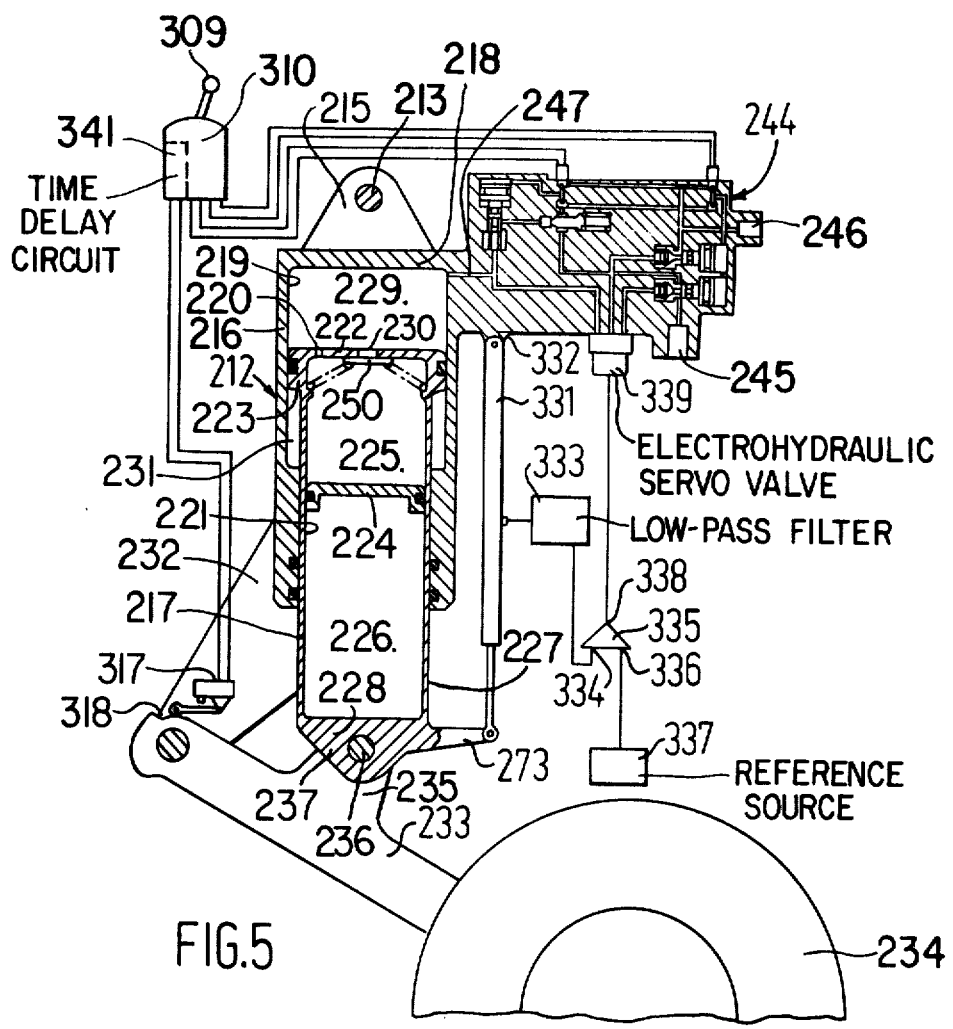
FIG. 5 is a cross-section of a suspension strut and control valve block shown in FIG. 4, drawn to a larger scale.
Figure 6:
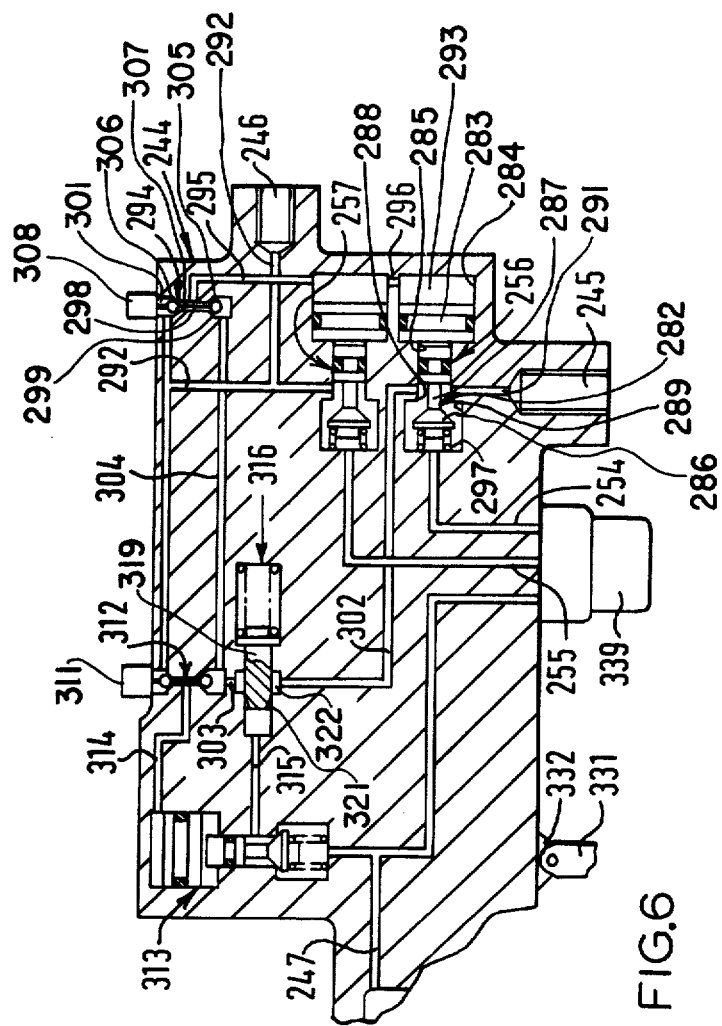
FIG. 6 is an enlarged cross-section of the control valve block shown in FIG. 5.

Referring now to FIG. 4, FIG. 5 and FIG. 6, the undercarriage is a modification of that shown in FIG. 1, FIG. 2 and FIG. 3. Parts which are identical with those shown in FIG. 1, FIG. 2 and FIG. 3 bear the same reference numerals with the addition of 200 to each.

An aircraft 211 incorporates a retractable undercarriage comprising a telescopic suspension strut 212 pivotably attached to the aircraft structure by a pivot pin 213 which extends through a bracket 214 on the airframe and a lug 215 on one end of the strut. The strut 212 comprises two concentric hollow cylinders 216, 217. The outer cylinder 216 incorporates a stepped bore comprising a large bore 219 and a small bore 221. An end wall at the end of large bore 219 further from the small bore 221 incorporates the lug 215.

The inner cylinder 217 is slidable in the small bore 221. One end of the inner cylinder nearer the end wall 218 incorporates an end wall 222 and an annular flange 223, the outer periphral surface of which is slidable in the bore 219. A floating piston 224 divides the space inside the inner cylinder 217 into an upper chamber 225, defined by a bore 227 in which the piston 224 slides and the end wall 222, and a lower chamber 226, defined by the bore 227 and another end wall 228 at the opposite end of cylinder 217 to end wall 222.

The cylinder 217, with the flange 223, divides the space encircled by bore 219 of the outer cylinder 216 into a chamber 229 and an annular chamber 231. The end wall 222 which separates chamber 229 from chamber 225 incorporates a small orifice 220 providing communication between chambers 229 and 225 for flow in either direction and a large orifice 230 closed by a plate 250 urged against the end wall 222 by a spring 260. The plate 250 and spring 260 act as a check valve which allows fluid flow through orifice 230 from chamber 229 to chamber 225 but not in the opposite direction from chamber 225 to chamber 229.

The outer cylinder incorporates a bracket 232 which pivotably supports one end of a swinging arm 233. The other end of the swinging arm 233 carries a wheel 234. Between the two ends of the swinging arm 233 there is incorporated a lug 235 which is pivotably connected to a lug 237 on the end wall 228 of the inner cylinder 217 through a pin 236. The connection formed by lugs 235 and 237 and pin 236 allows a degree of relative movement in the direction parallel to the direction of travel of wheel 234.

A lug 238 on the outer cylinder 216 provides, with pin 239, a pivotable connection with one end of an actuator strut 241, the other end of which is connected to the airframe through a pin 242 and bracket 243.

At the upper end of the outer cylinder 216 there is a valve block 244 having a port 245 for connection to the main hydraulic pressure supply of the aircraft and a drain port 246 for connection to the main unpressurised hydraulic return line. A passage 247 connects the valve block 244 with the chamber 229.

A linear travel transducer 331 connects between the bracket 273 on the swinging arm 233 and a lug 332 on the valve block 244. Electric signals from the transducer 331 are fed through a low-pass filter 333 to an input 334 of a differential amplifier 335 which compares the signal of input 334 with a fixed reference signal applied to another input 336 and which is derived from reference source 337. With the strut 212 in its mid-stroke position no output signal appears at the amplifier output 338. A deviation from this position which compresses strut 212 produces a positive signal at the output 338 which is proportional to the extent of the deviation and similarly a deviation from the mid-stroke position which extends strut 212 produces a proportional negative signal at the output 338.

The signal from the output 338 is applied to an electro-hydraulic servo valve 339 which is attached to the valve block 244. This electrohydraulic servo valve 339 replaces the ride control valve incorporating spool 48. The output from the electrohydraulic servo valve 339 is connected to passage 247, the hydraulic input is through passage 254 from shut-off valve 256 and the hydraulic return is through passage 255 to shut-off valve 257. A positive signal on the electrohydraulic servo valve 339 caused by compression of the strut 212 from its mid-position opens the valve 339 an amount proportional to the signal to allow oil under pressure from passage 247 and strut 212. Similarly, a negative signal caused by extension of the strut 212 opens the valve 339 an amount proportional to the signal to allow oil from the strut 212 to return to the aircraft main return line through passages 247 and 255. The low-pass filter 333 ensures that the electrohydraulic servo valve 339 responds to static load changes and low frequency variations in the ground reaction force on wheel 234 but not to high frequency variations such as are caused by rough airstrips.

The annular space 231 in the strut 212 is vented to atmosphere and space 226 is charged with nitrogen gas under pressure. Hydraulic pressure in passage 247 is transmitted to chamber 229 and to chamber 225 through the orifices 220 and 230 and acts on the floating piston 224 which thus forms a movable wall which loads the resilient means formed by the nitrogen gas in chamber 226. When the aircraft is stationary on the ground and there is no relative movement between the outer strut cylinder 216 and the inner strut cylinder 217, the pressure in chambers 225, 226 and 229 are the same and the ground reaction on wheel 234 due to the weight of the aircraft is taken by the swinging arm 233 and the strut 212.

When the strut 212 moves under taxiing conditions as described above and no oil enters or leaves through passage 247 the strut 212 acts as a conventional oleopneumatic shock absorber. Compression of the strut 212 causes oil to be forced from chamber 229 through the orifice 220 into chamber 225 and the floating piston 224 is moved downwards towards the end wall 228, compressing the gas in chamber 226. Similarly, extension of the strut 212 allows oil to flow back into chamber 229 from chamber 225 under the pressure of the gas in chamber 226 acting on the floating piston 224. The small orifice 220 acts as a damper for all extension movements of the strut 212 and for low velocity compression movements such as occur during taxiing on smooth runways. For high velocity compression movements such as occur during landing or taxiing on rough airfields, the plate 250 is forced away from the large orifice 230 by the pressure difference across the wall 222 and thus the large orifice 230 takes over the damping.

Each shut-off valve 256, 257 comprises a stepped bore in the valve block 244 in which is situated a poppet 282 and a piston 283. Each piston 283 is slidable in a large diameter bore portion 284 at one end of the stepped bore and abuts a plunger portion 285 formed at one end of the associated poppet 282. The other end of the poppet 282 is formed with an inverted frusto-conical head 286. The stem 287 of the poppet 282 is of smaller diameter than the plunger portion 285. The plunger portion 285 is slidable in a small diameter bore portion 288 of the stepped bore which is between the large diameter bore portion 284 and a medium diameter bore portion 289. The largest diameter of the frusto-conical head 286 is smaller than the medium diameter bore portion 289 but larger than the small diameter bore portion 288.

The pressure port 245 connects to the small diameter bore portion 288 of shut off valve 256 by a passage 291 which opens into that bore 288 at a position between the step of that bore 288 with the medium diameter bore portion 289 and the poppet plunger portion 285. The return port 246 connects by a passage 292 to an identical position in the stepped bore of valve 257. The passage 254 connects with the chamber encircled by the medium diameter bore portion 289 of valve 256 and the passage 255 connects with the chamber encircled by the medium diameter bore portion 289 of valve 257.

A chamber 293 is defined in each valve 256 and 257 between the closed end wall of the large diameter bore portion 284 and the piston 283 and each chamber 293 connects to a solenoid valve 294 through a passage 295 and linking passage 296. When pressure is supplied to each chamber 293 the associated piston 283 and poppet 282 are held in the position shown in FIG. 2 against the bias of a spring 297 acting between the end wall of the medium diameter bore portion 289 and the frusto-conical head 286 so that passage 291 communicates with passage 254 and passage 292 communicates with passage 255 by virtue of a gap between the frusto-conical head 286 and the step between the associated medium diameter bore portion 289 and small diameter bore portion 288. Operation of the solenoid valve 294 to exhaust passages 295 and 296 allows the spring 297 of each valve 256 and 257 to move the associated poppet 282 and piston 283 to the right, causing the frusto-conical head 286 to seat on the step between the medium diameter bore portion 289 and the small diameter bore portion 288 and cutting off communication between passages 291 and 254 and passages 292 and 255 respectively.

The solenoid valve 294 comprises a bore 298 linking two chambers 299 and 301. Passage 295 opens into bore 298, chamber 299 being supplied with oil under pressure through passage 291 and further passages 302, 303 and 304. Chamber 301 is open to the return port 246 through passage 292. Valve seats are formed at each end of bore 298 to allow each end to be alternately blocked by one of two part spherical heads 305, 306 on a stem 307 which is a loose fit in the bore 298. The head 306 is connected to the armature of a solenoid 308 such that when solenoid 308 is energised the head 306 is forced onto its associated seat to block that end of bore 298 which opens into chamber 301 and the head 305 is clear of its associated seat to open bore 298 to chamber 299. In this position oil under pressure is supplied to passage 295 to open the shut off valves 256 and 257 as described.

When shut-off valves 256 and 257 are open the undercarriage is in the taxiing condition. After the aircraft has taken-off the pilot actuates a selector lever 309 on an undercarriage control system module 310 which de-energises solenoid 308 to close shut-off valves 256 and 257.

The above description is particularly related to the strut, ride control valve and mechanism and the shut-off valves for inhibiting the connection of the ride control valve to the pressure source and drain when the aircraft is airborne. The following description is particularly related to undercarriage retraction and the restoration of ride control after undercarriage lowering and aircraft landing.

Having de-energised solenoid 308 to close shut-off valves 256 and 257, the undercarriage control system module 310 subsequently energises a solenoid 311 which is part of another solenoid valve 312 identical in construction to the solenoid valve 294. This solenoid valve 312 controls a third shut-off valve 313 which is identical in construction to the two shut-off valves 256 and 257. Referring to parts of valves 312 and 313 by the same references as the identical parts of valves 294 and 256 and 257, the bore 298 of solenoid valve 312 is connected to the chamber 293 of shut-off valve 313 by a passage 314. The medium diameter bore portion 289 of shut-off valve 313 connects with the passage 247 and a passage 315 connects the small diameter bore portion 288 between the step with the medium diameter bore portion 289 and the plunger portion 285 with a throttling valve 316. The throttling valve 316 comprises a spring loaded plunger 319 having slots 321 which allow a restricted flow from passage 302 to passage 315. Annular passage 322 allows unrestricted flow from passage 302 to passage 303. Solenoid valve 312 has pressure and return connections to passages 304 and 292 in a similar manner to valve 294. When solenoid 311 is de-energised the passage 314 is at return line pressure and shut-off valve 313 is closed.

Energising solenoid 311 after take-off opens the shut-off valve 313 by pressurising passage 314 and allows oil under pressure to be transmitted through passages 286 and 302, through the throttling valve 316 and passage 315 to passage 247 and the strut chambers 229 and 225, thus by-passing the ride control valve. This extends the strut 212 to its fullest extent whereupon a switch 317 attached to the bracket 232 and actuated by a cam profile 318 on the swinging arm 233 closes a circuit which causes the actuator strut 241 to be retracted, so that the whole assembly of strut 212 with valve block 244, swinging arm 233 and wheel 234, pivots about pin 213 and is drawn into a fuselage pod. The switch 317 also de-energises solenoid 311 so that shut-off valve 313 is closed to isolate the strut from the main hydraulic supply.

Prior to landing the aircraft, the pilot moves the undercarriage selector lever 309 to the "Undercarriage Down" position which extends actuator strut 241 to bring the undercarriage assembly back into the position shown in FIG. 4. On aircraft touch-down, the switch 317 completes a circuit through a time delay circuit 341 incorporated in the undercarriage control module 310 which energises solenoid 308 and opens shut-off valves 256 and 257 to bring the ride control into operation.

Each of the undercarriages described above is for use as one half of a main aircraft undercarriage gear. With a suitable steering arrangement it can be adapted as a nose undercarriage.

Ideally, all three undercarriage units of an aircraft should be according to the invention, but as a compromise it may be convenient to equip only the nose undercarriage which is the one which experiences the proportially greater variation in wheel to ground reaction force when the aircraft is braked.

I claim:

1. An aircraft undercarriage for supporting an aircraft structure comprising:
   a ground contacting element;
   a variable length liquid filled strut operatively connected to the aircraft structure and to the ground contacting element for supporting a proportion of the weight of the aircraft structure;
   resilient means for controlling the length of said strut in dependence on the load supported thereby;
   a movable wall acting on said resilient means in a direction to increase the load thereon under the pressure of liquid in the liquid filled strut;
   a liquid pressure source and a liquid drain;
   ride control valve means to selectively connect said strut to said source and said drain;
   a ride control mechanism operatively connected to the ground contacting element and the aircraft structure for sensing relative movement therebetween, and to the ride control valve means for maintaining the length of said strut constant with varying aircraft static load;
   and further valve means operative to isolate said strut from said source and said drain except when the aircraft is supported on the ground by the ground contacting means.

2. The aircraft undercarriage of claim 1 wherein said further valve means comprise a first shut-off valve in a liquid communication between said source and the ride control valve means and a second shut-off valve in a liquid communication between the ride control valve means and said drain.

3. The aircraft undercarriage of claim 2 wherein a common solenoid valve is provided to control both shut-off valves.

4. The aircraft undercarriage of claim 3, further comprising a switch, the common solenoid valve being controlled by the switch which is operated by movement of the ground contacting element relative to the aircraft structure, the arrangement being such that the shut-off valves are actuated by aircraft touch-down.

5. The aircraft undercarriage of claim 4 wherein a time delay circuit is connected between said switch and the common solenoid valve.

6. The aircraft undercarriage of claim 2 wherein a by-pass communication is provided between said source and said strut and a third shut-off valve is provided in the by-pass communication to enable said strut to be fully extended after aircraft take-off.

7. The aircraft undercarriage of claim 6 further comprising a solenoid valve which controls the third shut-off valve.

8. The aircraft undercarriage of claim 6 wherein a throttling valve is fitted in the by-pass communication to control the flow of liquid therein.

9. The aircraft undercarriage of claim 1 wherein the ride control mechanism comprises a mass suspended for movement in a vertical plane, a direct operative connection between said mass and the ride control means, and a spring and damper in parallel operatively connected to the mass and the ground contacting member.

10. The aircraft undercarriage of claim 9 wherein a springbox link comprising a pre-loaded spring is operatively connected to the spring and damper and to the ground contacting element, said pre-loaded spring being further loaded only during excessive movement of the ground contacting element relative to the aircraft structure.

11. The aircraft undercarriage of claim 1 wherein the ride control valve means comprises an electrohydraulic servo valve.

12. The aircraft undercarriage of claim 11 wherein the ride control mechanism comprises a travel transducer operatively connected to the aircraft structure and to the ground contacting element to sense relative movement therebetween and produce an electrical signal to control the electrohydraulic servo valve.

13. The aircraft undercarriage of claim 12 wherein a low-pass filter is connected between the travel transducer and the electrohydraulic servo valve.

14. The aircraft undercarriage of claim 13 further comprising a differential amplifier having two inputs and an output, and reference signal generating means, wherein one of said inputs is connected to the low-pass filter and the other of said inputs is connected to the reference signal generating means to compare the signals from each, and said output is connected to the electrohydraulic servo valve.

* * * * *

UNITED STATES PATENT OFFICE
CERTIFICATE OF CORRECTION

Patent No. 4,004,762      Dated Jan. 25, 1977

Inventor(s) Stanley Frederick Noel Jenkins

It is certified that error appears in the above-identified patent and that said Letters Patent are hereby corrected as shown below:

On the cover sheet, the assignee should read

-- Automotive Products Ltd., Leamington Spa, England --.

Signed and Sealed this

Sixth Day of June 1978

[SEAL]

Attest:

RUTH C. MASON  
*Attesting Officer*

DONALD W. BANNER  
*Commissioner of Patents and Trademarks*